Figure 1:
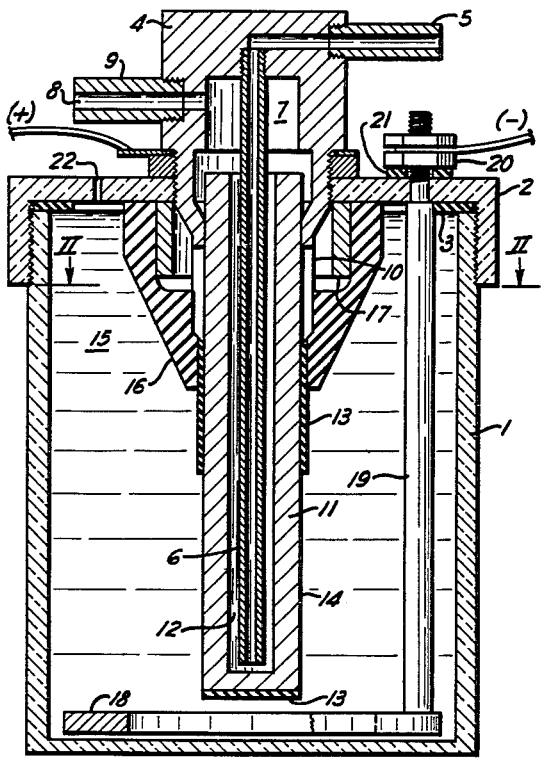

Aug. 14, 1962  M. G. JACOBSON ET AL  3,049,664
ELECTROCHEMICAL DETERMINATION OF COMPONENTS IN GAS MIXTURES
Original Filed Feb. 27, 1956

INVENTORS
MOSES G. JACOBSON &
FRANK J. DeLUCA
BY
Brown, Critchlow, Flick and Peckham
THEIR ATTORNEYS United States Patent Office 3,049,664
Patented Aug. 14, 1962

3,049,664
ELECTROCHEMICAL DETERMINATION OF COMPONENTS IN GAS MIXTURES
Moses G. Jacobson and Frank J. De Luca, Penn Hills, Pa., assignors to Mine Safety Appliances Company, Pittsburgh, Pa., a corporation of Pennsylvania
Original application Feb. 27, 1956, Ser. No. 568,111, now Patent No. 2,939,827, dated June 7, 1960. Divided and this application Aug. 5, 1959, Ser. No. 831,867
15 Claims. (Cl. 324—29)

This invention relates to the determination of the concentration of components of gas mixtures, where the determination is made through electrochemical means and methods involving the depolarization of an electrode in a galvanic cell by the component whose concentration is to be determined. The invention is particularly useful in determining oxygen deficiency in air atmospheres, e.g., in mine and manhole atmospheres and in submarines to ascertain whether it is safe for a man to enter without respiratory protection. It is also useful in determining lower ranges of oxygen concentration, as in the control of combustion gases or various industrial processes. Accordingly, although the invention is applicable to determinations of component concentrations up to 100 percent, it will be described herein with reference to oxygen and for a range from zero to 25 percent concentration.

The present invention is a division of our copending application, Serial No. 568,111, filed February 27, 1956, and now Patent No. 2,939,827.

This invention utilizes a primary cell of the Fery type, comprising a zinc anode, a porous carbon cathode and an electrolyte substantially of ammonium chloride, in which depolarization of the cathode depends upon the diffusion of oxygen in the sample mixture through the cathode to the electrode-electrolyte interface, where it oxidizes the hydrogen ions there liberated. The extent of the resulting depolarization is a function of the oxygen reaching that interface and presents a means for determining the oxygen concentration in the sample. Conventional cells of this type and their associated circuitry, however, are all predicated on a straight-line proportionality between the oxygen concentration and the depolarizing effect produced thereby. Dependence on such a proportionality has the disadvantage that, when the cell is used to determine oxygen concentration in two successive samples of gas having widely different oxygen concentrations (particularly when the change is from a low to a high concentration), the indicating meter first overshoots the true reading and then fluctuates on either side of it for some time before coming to rest. This performance of the instrument is caused by variations in internal electrical resistance of the cell and by secondary changes produced thereby, when changing from one oxygen concentration to another. These variations and changes proceed at a much slower rate than the change of electromotive force, and therefore, the current output reaches equilibrium only after a few fluctuations. In the hands of inexperienced and impatient personnel, it may result in a false reading of the oxygen concentration.

It is accordingly among the objects of the present invention to provide a method and apparatus for the electrochemical determination of oxygen concentrations in gaseous atmospheres that will be practically free of variations in the internal electrical resistance of the detector cell and thereby assure the smooth, nonfluctuating response of the indicating meter.

Another object is to provide improved electrical circuitry that can be used to particular advantage with the detector cell described herein and claimed in our copending application, Serial No. 568,111, as well as with other galvanic detector cells of the Fery type.

A further object is to provide a method and means for standardizing the polarizable electrode used in detector cells of the foregoing type, so that such electrode may be readily interchangeable.

Figure 2:
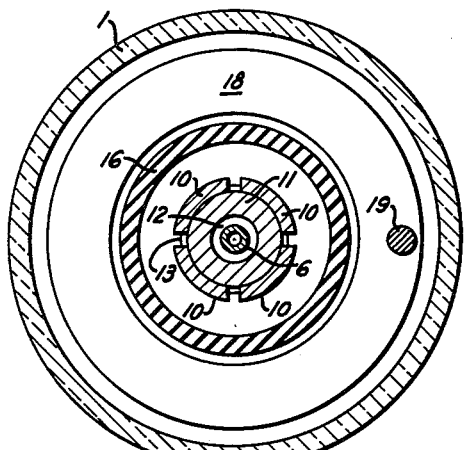
Figure 3:
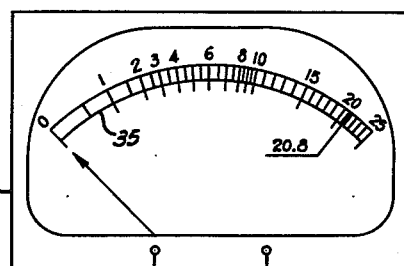
Figure 3:
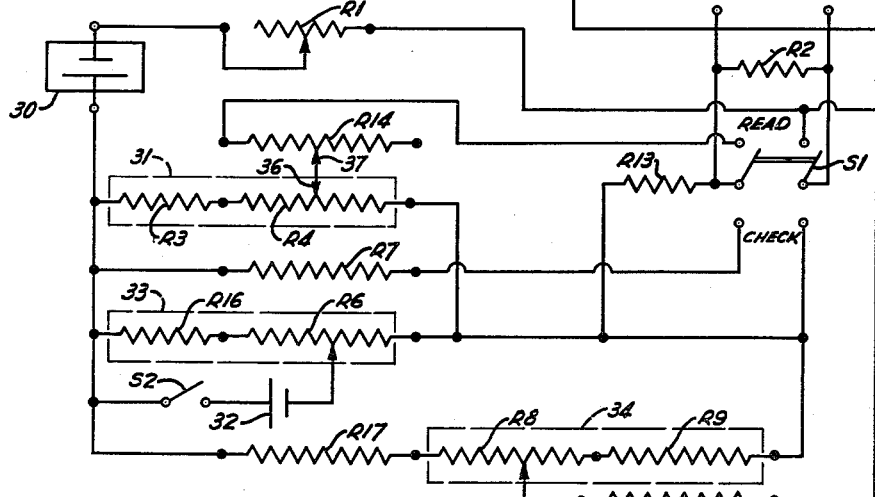

Other and further objects of the present invention will appear from the following description of a preferred embodiment with reference to the accompanying drawings, in which FIG. 1 is a side elevation, mostly in section, of the preferred embodiment of the improved detector cell;
FIG. 2 is a sectional plan view along the line II—II of FIG. 1; and
FIG. 3 is a wiring diagram of the circuit arrangement incorporating the detector cell of FIG. 1.

Although it will be understood that this invention can be used with other types of galvanic cells, the electrical energy output of which varies with the concentration of a depolarizing component at one of its electrodes, the present invention will be described in connection with the galvanic cell detector described in our copending application Serial No. 568,111, and in connection with oxygen as the depolarizing component. With that cell, means are provided, including adjustable resistors and an electric meter, for measuring and adjusting the electric current to provide proportionality between the square root of the oxygen concentration of the gaseous mixture at the cathode of the cell and the electric current as indicated on the meter, the meter being provided with a square root scale for reading directly the oxygen concentration. As shown below, with such a square root relationship, the internal resistance of the detector cell is substantially independent of the oxygen concentration, so that the meter responds smoothly, without overshooting or fluctuating.

In the improved electrical circuit of this invention, provision is made (1) for maintaining constant the electrical energy applied from an external source, irrespective of variations of that source; (2) for adjusting the indicating means to zero against residual current in the absence of depolarizing components, and (3) for automatic compensation of deviations from the square root, or other relationship due to variations in and aging of electrodes. Moreover, the improved circuit employed by applicants attains all these objectives by the use of a single source of external electric power, specifically, a small flashlight-type dry cell instead of the two or three separate batteries used in former devices.

Referring to FIGS. 1 and 2, a detector cell of the Fery type includes a cylindrical container body 1 of insulation material, such as "Lucite," and a top 2 of the same material screwed on the body. A gasket 3 provides a seal between these two parts. A hollow metal head 4, serving in part as an electrode support, is threadably mounted on the top 2, preferably in the center; and the lower part of the head projects down into the container. The head is provided with a hose fitting 5 communicating with one end of a tube 6, which extends below the head and well into the container. The recess 7 within the head and around the tube 6 communicates with an opening 8, which is provided with a hose fitting 9. The fittings 5 and 9 are used for admitting and withdrawing the gaseous atmosphere whose oxygen content is to be determined, the direction of gas flow therein being immaterial.

The lower portion of the head 4 is vertically slotted to form quadrant gripping fingers 10 for releasably supporting, and effecting electrical contact with, a cathode 11. This cathode is preferably made of the purest carbon available and is of sufficient porosity to permit rapid diffusion of gas through its pores. However, other materials may be used besides carbon if they have the required porosity and are otherwise suitable as a cathodic electrode in a galvanic cell. A carbon electrode that has been found satisfactory in use has the form of a rod of ¼" external diameter, with a central bore 12 of about 1/8″ diameter extending from the open top of the electrode to within about 1/16″ of its bottom. When the electrode is secured in the head 4, the lower end of tube 6 is received within the bore 12 and extends almost to the bottom of the electrode. The dimensions of tube and bore are such that there is only a small clearance between the outer wall of the tube and the inner wall of the electrode. A portion of the exterior surface of this electrode projecting below the fingers 10 is coated with a suitable insulation 13, such as varnish, baked enamel, or the like, and the bottom of the electrode is similarly coated, so that only a predetermined area 14 of the electrode between those insulated coatings is exposed to the action of a liquid electrolyte 15 that is contained in the cell. This exposed, uncoated surface of the electrode is 1 1/8″ long for the cell and circuit herein described, and that surface is waterproofed as thoroughly as possible by known waterproofing agents to render it substantially impermeable to the electrolyte, but does not prevent diffusion of gas from the interior of the electrode to the electrode-electrolyte interface.

To seal the upper portion of the carbon electrode and lower portion of the head 4 from the electrolyte within the cell, an elastic cup-like tubular shield 16 of rubber, or other suitable material, is placed over the insulated portion of the electrode and also over a depending collar 17 secured to the top 2 and preferably made of the same insulation material. The fit of this elastic shield is sufficiently tight to make a complete and effective seal between the electrolyte 15 and the head 4, so that it effectively divides the cell into a gaseous chamber and a liquid chamber, and prevents electrolyte from reaching the metal head 4 and sample gas from leaking through to the electrolyte; it cooperates with the insulated areas of the cathode to confine the electromechanical action of the electrolyte to a definite cathode area, a confinement that is necessary to keep the calibration curve constant. An anode 18 of zinc, in the form of a ring, is suspended in the electrolyte by a stainless steel rod 19 secured to the top 2 by a nut 20 and a gasket 21. A vent 22 in the top of the cell permits the escape of gases from the cell, but is small enough to prevent spillage of electrolyte if the cell is tilted, so that a cell of this construction is well suited for use in a portable indicating device.

The preferred electrolyte in the cell is a dilute solution (2 to 5 percent) of ammonium chloride, acidified as, for example, by addition of hydrochloric acid to a pH of 3.0, at which point there is no observable development of hydrogen at the zinc anode. Buffering materials may be added to the electrolyte solution to maintain it longer at the desired acidity.

Referring to FIG. 3, which shows the preferred electrical circuit associated with the cell of this invention, the detector cell is indicated therein by the reference numeral 30. The cathode, or positive terminal, of the cell is the carbon electrode 11, while the anode, or negative terminal, of the cell is the zinc ring 18. The cell is connected in a "compensated" circuit loop that includes the following series connected elements: a variable resistor R1, a double-pole, double-throw switch S1 (in its "Read" position), a microammeter M (with its shunting resistor R2), a variable resistor R14, and one adjustable part of a compensating potentiometer 31, which serves as a calibration control and is operatively associated with the variable resistor R14. This compensating potentiometer includes a fixed resistor R3 and a potentiometer rheostat R4.

The circuit of FIG. 3 also includes a "compensating" circuit loop, comprising the following series connected elements: a dry cell 32, or other source of external E.M.F., an on-off switch S2 and the compensating potentiometer 31. Connected across this loop is an applied voltage control 33, comprising a potentiometer rheostat R6 and a resistor R16. Means are provided through switch S1 (in its "Check" position) for directly measuring the applied external voltage at any time across the compensating potentiometer 31 through a high resistance R7 in series with the meter M.

A third circuit loop is provided to serve as a zero control, by means of which the meter M is adjusted to a zero reading in the presence of an oxygen-free gas within the cathode of the detector cell. This loop includes a chain of series connected elements, comprising resistor R17, potentiometer rheostat R8 and resistor R9; and the end points of the chain are connected to the terminals of the compensating potentiometer 31. Thus, the total voltage applied to the terminals of this chain is always the same as that applied to the compensating potentiometer 31. Of this total value, an adjustable part between the right hand terminal of R9 and the slider of the potentiometer rheostat R8 is applied, through high resistances R10 and R13, to the meter M when switch S1 is in the "Read" position. This arrangement thus serves as a voltage divider to take off an adjustable part of the predetermined and checked voltage at the terminals of the compensating potentiometer 31, which voltage is then further greatly decreased by resistors R10 and R13 before being applied to the meter M.

When a detector cell 30, of the type herein described, is connected through a constant external resistance circuit to a current measuring instrument, the observed electric current is a function of the oxygen concentration of the gas at the electrode-electrolyte interface of the carbon cathode. It has been established by former work of one of the applicants that this electric current I varies with the oxygen concentration C substantially (since only negligible electric current is obtained when the oxygen concentration is zero) according to the formula:

$$I = K_1 C^y \tag{1}$$

where $K_1$ is a constant whose magnitude depends on the geometry and condition of both electrodes in the cell, the conductivity of the electrolyte, and the circuit resistance; the exponent $y$ depends only on the characteristics of the carbon electrode and on the external as well as internal circuit resistance. For a given cell and set of electrodes, $y$ depends only on the external circuit resistance.

Similarly, the E.M.F. of such a polarized galvanic cell is found to substantially follow the formula, $$E = K_2 C^z \tag{2}$$

where $K_2$ and $z$ are parameters determined by factors similar to those that are effective for the parameters $K_1$ and $y$ in Formula 1 above; and under given conditions are constant and depend only on the external circuit resistance.

Since the electric output of this detector cell in the absence of oxygen is practically zero, and since thermal effects are also too small to be observed, the electric energy produced by the cell when a gas sample is passing through the cathode bore at a constant pressure is proportional to the oxygen concentration C, i.e., $$W = KC \tag{3}$$

Since it is known that the electric power is expressed by $W = EI$, we have $$W = IE = KC \tag{4}$$

The correctness of the above relationships has been fully confirmed by a large number of experiments. As a result, if we substitute in Formula 4 the values for I and E given in Formulas 1 and 2, we have $$W = IE = K_1 K_2 C^{y+z} = KC \tag{5}$$

therefore $$y + z = 1 \tag{6}$$

Again if Formula 2 is divided by Formula 1, we obtain $$\frac{E}{I} = \frac{K_2}{K_1} C^{z-y} \tag{7}$$

and by substituting for $z$ the value given by Formula 6, we get $$\frac{E}{I} = \frac{K_2}{K_1} C^{1-2y} \qquad (8)$$

According to Ohm's law, the above relationship may also be expressed as follows:

$$\frac{E}{I} = R_{ext.} + R_{int.} = \frac{K_2}{K_1} C^{1-2y} \qquad (9)$$

where $R_{ext.}$ is the external resistance of the circuit, and $R_{int.}$ is the internal resistance of the cell.

In the above equation 9, when $y$ equals ½ (and $z$ therefore also equals ½), then $$R_{ext.} + R_{int.} = \frac{K_2}{K_1} = \text{a constant} \qquad (10)$$

This means that when $y$ equals ½, i.e., $I$ equals $K_1\sqrt{C}$, not only does $E$ also follow a square root dependence on the concentration $C$, but the internal cell resistance is entirely independent of the oxygen concentration.

When the E.M.F. of the cell is not zero for zero oxygen concentration (as in practice it never is, due to impurities, etc.), and especially when it is augmented by an E.M.F. from an external source as in the preferred embodiment of this invention, with such a square root dependency between the current in the external circuit and the oxygen concentration at the cathode, the internal cell resistance is not completely independent of the oxygen concentration, but we have found that its variation with concentration is at a minimum as compared to all other scale relationships between current and oxygen concentration. This is not easy to deduce mathematically, as in the above simplified case, but has been proved correct by a number of tests conducted by applicants. Accordingly, the meter M is provided with a square root scale 35. This scale gives direct readings of the oxygen concentration in the gas being tested, since the deflection of the meter pointer is a function of the square root of that concentration.

In determining the percentage of oxygen concentration using a square root proportionality in accordance with the above theory, it is not necessary that the area of the cathode electrode-electrolyte interface be small, as it must be to obtain the high current densities required for straight-line proportionality. For this reason, the exposed surface of the carbon electrode 11 in FIG. 1 is relatively very large in comparison with the exposed area required in straight-line calibrating devices (cf., the patents and copending application referred to in the second paragraph of this specification). However, in order not to deviate from the chosen calibration curvature (which in the preferred embodiment is the square root relationship), the current density at the surface of the carbon electrode must still be maintained at a constant, though not at a high, value. Therefore, after all electric circuit parameters are fixed, the exposed carbon area must be held as constant as possible. Small variations can be taken care of by a change in the resistance of the "compensated" circuit loop immediately connected to the detector cell. This is carried out according to the present invention in the manner described below.

In addition, the current output of the cell must be kept low to maintain the determinations of oxygen concentration independent of concentrations of carbon dioxide and other oxidizing gases that may be present in the gaseous mixture. One way to keep the current low would be to provide a very high external resistance, but this would slow the response of the circuit and would be otherwise undesirable. We prefer, therefore, to reduce the current in the cell circuit (the "compensated" circuit loop) by injecting into that circuit an adjustable opposed current from an external E.M.F. source. The net electric current drawn from the detector cell at 20.8 percent oxygen differs slightly for industrial instruments, depending on the individual value of the meter resistance, but on an average is about 70 microamperes.

In the "compensated" circuit loop, or cell circuit, which has been generally described above, the variable resistor R1, having a value of 500 ohms, is used initially with a standard cell having a standard cathode inserted in place of the cell 30 to adjust the circuit response to follow the square root scale of the meter. This adjustment compensates for variations in the meter M and other circuit components of the detector cell loop and, once made, need not be repeated unless those circuit components are changed. The meter M, which is adapted to be connected in series in this loop by closing the switch S1 to its "Read" position, is a microammeter having a full scale reading of about 20 microamperes and a resistance of 1400 to 1500 ohms, and its shunting resistor R2 has a value of 500 ohms. Rheostat R14 has a value of 1000 ohms. The resistors of the compensating potentiometer 31, part of which is common to both the "compensated" and "compensating" loops, have a value of 100 ohms for R3 and 200 ohms for R4. The slider 36 of potentiometer rheostat R4 is operatively connected to slider 37 of rheostat R14. The specific functions of those rheostats and the reasons for coupling them are explained below.

The polarity of the external E.M.F. source 32 in the "compensating" loop is so arranged that the current injected into the "compensated" loop will oppose the current of detector cell 30. The magnitude of the injected current is adjusted by the potentiometer rheostat R6 in the applied voltage control 33 (in which resistors R6 and R16 each have a value of 1000 ohms), which controls the voltage applied across the compensating potentiometer 31, and depends upon the characteristics of the specific cathode used in the detector cell. So long as the same cathode is used, the value to which this injected current is adjusted (as measured by this applied voltage) remains constant. In order that the operator may properly adjust it and be assured that it does remain constant, we have provided a "Check" position for the switch S1 to measure the applied voltage across potentiometer 31, using the same meter M as is used in reading the oxygen concentration. In the "check" position of switch S1, the meter is connected in series with a high resistance (20,000 ohms) resistor R7 so that the meter acts as a voltmeter.

To determine the proper applied voltage for a specific carbon cathode, that cathode is placed in an otherwise standard cell and connected in a standard circuit of the type herein described. The external applied voltage across potentiometer 31 is then adjusted to give a correct reading on the scale of meter M when the cathode of the detector cell is contacted by a gas of known oxygen content. The carbon cathode is then tagged with that applied voltage figure. When that cathode is later used, either as the original cathode or as a replacement for an old cathode, in another cell connected in a similar circuit, the applied voltage across potentiometer 31 is made to correspond to the "Check" voltage tagged on the electrode. Any adjustments that are required to be made in this applied voltage are made, with switch S1 in its "Check" position, by adjusting the applied voltage control 33 until the meter reading gives the correct voltage for the specific carbon cathode then in use. The higher the "Check" voltage reading for a specific carbon cathode, the higher will be the applied voltage in the "compensating" loop and the higher will be the opposing electric current injected from that loop into the "compensated" loop. Therefore, the higher the "Check" voltage reading, the lower will be the meter indication in the "Read" position. To bring the net current in the "compensated" loop (which is the current indicated in the "Read" position of switch S1) back up to the standard value at 20.8 percent oxygen when the cathode is in contact with air, calibration control R4 of potentiometer 31 is adjusted to the left (on FIG. 3); but simultaneously the resistance of R14 (which is operatively coupled to R4) is decreased to compensate for all variations from the square root scale in the direction of too high readings. In this way, not only the small deviations from standard size of the exposed carbon area of the cathode, but also deviations from standard values of other electrode characteristics, such as porosity, degree of waterproofing, aging, etc., are automatically taken care of.

As the electrical energy output of the detector cell decreases with age, the meter pointer will fall below 20.8 percent when the detector cell is operated on air. To bring it back the coupled sliders 36 and 37 of R4 and R14 are moved to the left as described above. Again, the resulting change in the resistance of R14 serves to correct small deviations of the calibration curve away from the square root relationship that otherwise would occur. The direction of those deviations is dependent on the change in the internal resistance of the cell, which in turn is dependent, among other factors, on the condition of the surface of the carbon electrode and is affected by the aging of that electrode. For a carbon electrode having the preferred dimensions of its exposed area as stated herein (1/4" O.D. by 1 1/8" long), this deviation with age is towards too high a reading for oxygen concentrations below 15 percent. In case the carbon electrode has a considerably smaller effective area exposed to the action of the electrolyte than is herein stated, either because the electrode dimensions are different or because the area is reduced by excessive occlusion of the pores in the carbon surface through aging, these devications may be towards too low readings for oxygen concentrations below 15 percent. In that event, the circuit connection from the left hand terminal of switch S1 should be made to the right hand side of resistor R14, instead of to the left hand side as shown in FIG. 3.

In the "zeroing" loop, the resistors may have the following values for the detector cell and circuit herein described: 500 ohms for R17, 1000 ohms for R8, 500 ohms for R9, 20,000 ohms for R10, and 10,000 ohms for R13. Here again, in zeroing the instrument on an oxygen-free gas with switch S1 in its "Read" position, the operator can check the applied external voltage by throwing the switch to its "Check" position, since the same external E.M.F. source (battery 32) is used in each switch position and since the voltage check points of the "zeroing" loop are exactly the same as those of the "compensating" loop.

The above parameters given for the components of the circuit may, of course, be varied without departing from the present invention. In addition, it will be understood that many pairs of fixed and variable resistors can be combined into one variable resistor (e.g., R3 and R4) or can be further sub-divided into fixed and variable resistors having the total indicated resistance.

In using this apparatus for determining the oxygen concentration in various gases, the gas sample can be conveniently introduced into the detector cell by aspiration with a bulb (not shown), or otherwise, and it is immaterial whether the gas is introduced through fitting 5 or fitting 9. In either case, the gas sample passes through the small annular passage between the tube 6 and the wall of the bore 12 in the carbon electrode. Because that passage is narrow, any gas previously present therein is quickly flushed out, and the meter promptly responds to the oxygen concentration in the sample. Further, due to the relatively high velocity of flow of the sample gas through this passage, there are always sufficient oxygen molecules from the sample available for depolarization at the cathode-electrolyte interface. Before the gas sample is introduced into the detector cell, the operator should close switch S1 to its "Check" position and adjust the applied voltage control 33 to the value determined for the specific carbon electrode then in use, as previously explained herein. The next preliminary step is to calibrate the instrument on air by aspirating air through the carbon cathode and adjusting the calibration control 31 so that the meter reads 20.8 percent. In order that circuit conditions may be in operating equilibrium, it may be necessary to repeat the above adjustments after a warm-up period of five minutes or so. In addition to calibrating the instrument at 20.8 percent on air, for some applications it may be necessary from time to time to recheck the zero adjustment on an oxygen-free gas (or a gas having an oxygen content no greater than 0.2 percent). The frequency of these checkings and the adjustments resulting therefrom are entirely dependent on the application in which the instrument is used. In testing oxygen deficiency in air atmospheres in the range above 12 percent oxygen, the purpose of the test is usually to determine whether it is safe for a man to enter a mine shaft, manhole, or ship hold, etc. without respiratory protection. For this application, no adjustment is needed beyond setting the voltage to the proper "Check" reading and calibrating at 20.8 percent on air before testing the unknown sample. On the other hand, in process control tests, where the range of oxygen concentration varies between 5 and 25 percent, the zero adjustment should be checked about once a week in addition to the checks referred to above. When the tests may involve even lower percentages of oxygen concentration, as in applications to combustion control and inert atmosphere checks, highest accuracy will be obtained by daily checking of the zero calibration. It has been found that even where the greatest accuracy is desired over any portion of the scale shown in FIG. 3, and where the instrument is in continuous use, the instrument need be rechecked on air (20.8%) only after every three or four tests and the external voltage need be rechecked after the warm up no oftener than once in two hours.

It will be apparent from the foregoing description that the testing procedure involving the use of this invention is simplified to such extent that it can be easily carried out and checked by unskilled personnel, that the square root calibration employed permits an accurate determination of oxygen concentration within a wide range, and that the procedure for "checking" or standardizing the polarizable electrodes, i.e., compensating for the specific characteristics of different electrodes, permits the ready replacement of one electrode by another.

Among the distinguishing features and advantages of the present invention are the means and procedures provided for standardizing the polarizable detector electrodes by measuring the amount of electrical energy injected into the compensated detector loop circuit from the auxiliary compensating dry cell circuit, or more specifically by measuring or "checking" the current or voltage across a resistance in the compensating loop circuit. This "check" reading, obtained for a detector electrode in a standard cell under standard conditions, is then used as a characteristic of that particular electrode and is kept constant throughout the life of the electrode.

While the present invention has been described herein with specific reference to determining the oxygen concentration in a gaseous mixture, it will be understood that the invention is equally applicable to determining the concentration of other oxidizing components of a gaseous mixture (such, for example, as fluorine, chlorine and some oxides of nitrogen), since those components would have a similar depolarizing effect. Moreover, it will be understood by those versed in the art that this invention could also be used for determining the concentration of a non-oxidizing component of a gaseous mixture by measuring the depolarizing effect of that component on a suitable combination of electrodes and electrolyte. Likewise, the structural features of the galvanic cell herein described could be used in a cell having a polarizable anode, instead of a polarizable cathode.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. In an instrument in which the concentration of a depolarizing component of a gaseous mixture is measured by its effect on a polarizable electrode of a galvanic detector cell in contact with the mixture, an electrical potentiometer circuit including the detector cell, the circuit comprising a compensating circuit loop containing a dry cell in series with the full resistance of a potentiometer rheostat, a compensated circuit loop containing the detector cell in series with an adjustable part of said potentiometer rheostate and with an electric meter and with a variable resistor, the variable resistor being operatively linked with the potentiometer rheostat to change automatically the resistance of the compensated circuit loop in a predetermined way whenever the potentiometer rheostat is operatively adjusted, thereby to maintain a desired curvature of calibration of the meter against variations of electrode characteristics due to substitution of one electrode for another in the detector cell and to aging of the electrode therein.

2. Apparatus in accordance with claim 1 that also includes means for adjusting the current through the potentiometer rheostat to a predetermined value and for maintaining the current at that value.

3. Apparatus according to claim 2, in which said means includes a second potentiometer rheostat having its full resistance connected across the full resistance of the first potentiometer rheostat and having a variable resistance portion connected across the auxiliary power source.

4. In an instrument in which the concentration of a depolarizing component of a gaseous mixture is measured by the depolarization of an electrode of a galvanic cell, means for compensating for the characteristics of the specific electrode, comprising means for adjusting the electric current through the detector cell and through an electric meter connected thereto to obtain a constant current value for a given component concentration at different adjustable voltages applied to the detector cell from an external auxiliary source of electrical energy, said voltages being determined by the characteristics of said electrode.

5. Apparatus in accordance with claim 4, including additional means for indicating the relative magnitude of the electrical energy injected from the auxiliary voltage source by measuring the voltage in a part of the circuit that is a function of said energy.

6. Apparatus in accordance with claim 5, in which the voltage is measured by said meter in series with a high resistance and a switch.

7. In connection with apparatus for measuring the concentration of a component of a gaseous mixture by its depolarizing action on a galvanic detector cell which has an exchangeable polarizable electrode and an electric current output that is a non-linear function of the concentration, the method of standardizing an electrode to conform to said function comprising the following steps: (1) inserting said electrode into a cell of standard construction; (2) drawing current from the cell through a standard electrical circuit; (3) measuring the electric current going through the cell while passing a gaseous mixture having a known concentration of the component to be measured into contact with said electrode; (4) passing a second gaseous mixture with a different known concentration of the component to be measured into contact with said electrode; (5) adjusting a circuit parameter until the cell current in step 4 equals a value calculated from the current measured in step 3 according to said non-linear function; and (6) identifying said electrode with the value of said adjusted circuit parameter obtained in step 5, and henceforth when using said electrode in a standard cell and circuit adjusting said circuit parameter to the identifying value of said electrode.

8. An electrode standardization method according to claim 7, in which said adjusted parameter is the effective electrical resistance of that portion of the detector cell circuit that is external to the cell itself.

9. An electrode standardization method according to claim 7, in which said adjusted parameter is the amount of electrical energy injected into the detector cell circuit from an auxiliary source of electric power.

10. An electrode standardization method according to claim 7, in which one of said gas mixtures of known concentration of the component to be tested for is air.

11. An electrode standardization method according to claim 7, in which the current output is a proportionality between cell current and the square root of the concentration of the component tested for.

12. Apparatus for the electrochemical measurement of the concentration of a depolarizing component of a gaseous mixture, comprising a primary detector cell having a polarizable electrode adapted to be contacted by the gaseous mixture; a compensated circuit loop that includes the detector cell and a variable resistor and an electric meter and an adjustable part of a first potentiometer rheostat connected in series; a compensating circuit loop that includes an auxiliary source of electric power and the full resistance of the first potentiometer rheostat connected in series; measuring means for measuring the electric current flowing through the compensating loop; and adjusting means for adjusting said current to a predetermined value depending on the characteristics of the polarizable electrode and for maintaining said current at that value while that electrode is used in the primary detector cell.

13. Apparatus according to claim 12, in which said measuring means includes means for selectively connecting the meter across the full resistance of the first potentiometer rheostat and in which said adjusting means includes a second potentiometer rheostat having its full resistance connected across the full resistance of the first potentiometer rheostat and having its variable resistance connected across the auxiliary power source.

14. Apparatus according to claim 13, in which the means for selectively connecting the electric meter across the full resistance of the first potentiometer rheostat includes a double-pole-double-throw switch that in one of its throw positions connects the meter as a voltmeter in series with a high resistance across the full resistance of the first potentiometer rheostat and in the other of its throw positions connects the meter in the compensated circuit loop.

15. Apparatus according to claim 12 that includes the following additional elements: a voltage divider circuit having a primary circuit loop connected in parallel with the full resistance of the first potentiometer rheostat and having a secondary circuit loop containing a separate potentiometer rheostat which selects a part of the voltage applied to the first potentiometer rheostat and applies that part through a high resistance to the meter for correcting the meter reading to zero in the presence of any current in the compensated loop in the absence of a depolarizing component in the gaseous mixture at the electrode of the detector cell.

References Cited in the file of this patent
UNITED STATES PATENTS

| | | |
|---|---|---|
| 2,382,735 | Marks | Aug. 14, 1945 |
| 2,414,411 | Marks | Jan. 14, 1947 |
| 2,560,857 | Gambetta | July 7, 1951 |
| 2,651,612 | Haller | Sept. 8, 1953 |
| 2,795,756 | Jacobson et al. | June 11, 1957 |